Figure 1:
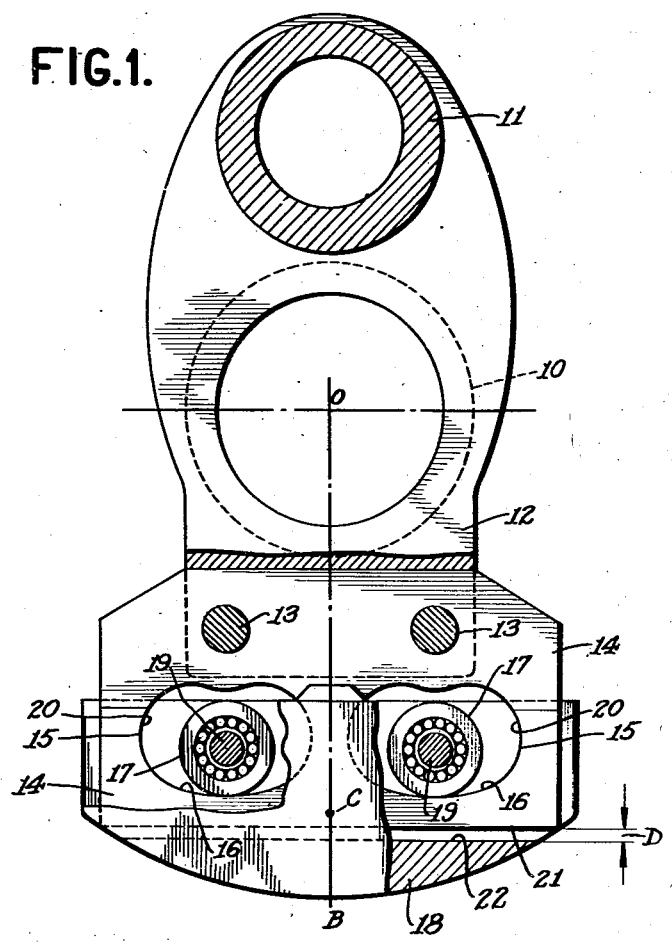

Oct. 19, 1943.  A. T. GREGORY ET AL  2,332,072

VIBRATION DAMPING DEVICE

Filed Aug. 6, 1942

INVENTORS
ALFRED T. GREGORY
AND FREDERIC E. FULLER

ATTORNEYS

Patented Oct. 19, 1943

2,332,072

UNITED STATES PATENT OFFICE 2,332,072

VIBRATION DAMPING DEVICE

Albert T. Gregory, Massapequa, and Frederic E. Fuller, Bethpage, N. Y., assignors to Fairchild Engine and Airplane Corporation, Farmingdale, N. Y., a corporation of Maryland Application August 6, 1942, Serial No. 453,798

8 Claims. (Cl. 74—604)

This invention relates to vibration dampers and has particular reference to synchronous pendulum dampers of the type disclosed in Patent No. 2,272,189, issued February 10, 1942, to C. C. DePew, although the invention is not limited to that particular damper.

Synchronous pendulum vibration dampers are tuned to the order of torsional vibration that is sought to be reduced, so as to create the same number of counter-impulses for each crankshaft revolution as the disturbing torsional oscillations. Inasmuch as the frequency of the pendulum is determined by its length and its linear amplitude varies also with its pendulum length, a pendulum damper tuned to a low order of vibration swings through a longer arc for a given angular motion than a pendulum tuned to a higher order, say to the sixth order. Consequently, whenever the pendulum overswings, as it may do during irregular operation, starting, acceleration and deceleration of the engine, the impact of the damper counterweight against the stops, or other travel limit abutments, causes a torsional shock on the crankshaft, and this shock is greater with a high amplitude or low order damper than with a higher order damper, all other things being equal. Thus, although such overswing shocks occur with pendulum dampers of all orders, the magnitude of the impact is usually greater with low order dampers.

In accordance with the present invention, a dynamic or synchronous pendulum damper is provided in which the shock incident to irregular operation, starting, acceleration and deceleration of the engine is materially reduced, and is converted from a harmful torsional shock to a relatively harmless radial impact, which accordingly does not augment the condition of torsional vibration which the damper is intended to reduce.

In a preferred embodiment of the invention, the crankshaft is provided with an abutment of relatively large area arranged normal to the radius from the axis of rotation of the shaft through the center of gravity of the counterweight at its mid position; the counterweight is provided with a complementary abutment parallel to but normally spaced from the crankshaft abutment, and the races in which the counterweight rollers or other mobile conveyors move, are so shaped that the counterweight is guided at the limit of its travel in a direction parallel to said radius, and normal to said abutments. Accordingly, when the counterweight overswings for any reason in either direction, the counterweight moves radially inwardly because of the configuration of the races, and the abutment on the counterweight flatly engages the abutment in the crankshaft. With this arrangement the shock of the engagement, which ordinarily is a tangential force, is converted into a radial force with a negligible torque component, and hence does not tend to twist the crankshaft, and also the smooth, shockless change in the direction of movement of the counterweight from tangential to radial, being opposed by the centrifugal force acting on the counterweight, materially reduces the magnitude of the impact.

It will be seen that the improvement of the present invention provides a very simple and effective means for overcoming one of the principal defects of dynamic pendulum counterweights, and without increase in the number of parts.

Figure 2:
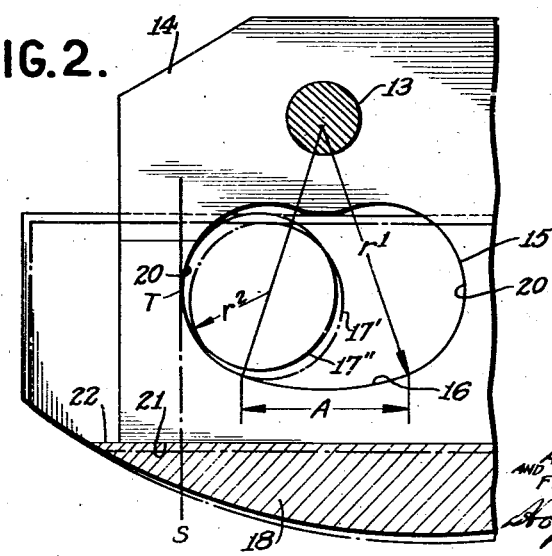

For a more complete understanding of the invention, reference may be had to the accompanying drawing, in which:

Figure 1 is an end elevation of an engine crankshaft equipped with one form of dynamic damper provided with the present invention; and Fig. 2 is a fragmentary enlarged view of the damper and illustrates the invention in greater detail.

Referring to Fig. 1 of the drawing, numeral 10 designates the crankshaft of an internal combustion engine, such as in-line aeronautical engine, of which 11 is one of the crank pins. Bolted to an extension 12 of the crank cheek by means of bolts 13 is an adapter plate 14 having formed therein two arcuate or kidney-shaped slots 15, the lower surfaces 16 of which form races on which the wheels or rollers 17 of counterweight 18 roll during oscillation of the counterweight in response to torsional crankshaft oscillations. The counterweight 18 is generally U-shaped in transverse section, embracing the adapter plate 14 and carrying the axles 19 on which the wheels or rollers 17 rotate, suitable friction-reducing means such as needle bearings or the like being interposed between the wheels or rollers 17 and their axles 19, as shown. The centers of curvature of the two races 16 are spaced apart the same distance as the centers of the axles 19 of the rollers or wheels 17, so that the counterweight always swings parallel to itself, as described in said DePew Patent No. 2,272,189.

Referring to Fig. 2, the length of the radius $r'$ of curvature of the races 16 is determined by the length of the pendulum, which is in turn determined by the order of oscillation desired for the pendulum, which must equal the order of torsional vibration to be damped The method of determining the appropriate pendulum length of the vibration to be damped is described in DePew Patent No. 2,272,189, and forms no part of the present invention. For purposes of illustration, the pendulum shown is of a low order, such as 1½, and hence is equivalent to a long pendulum and has a relatively large amplitude of oscillation, so that races 16 are relatively long. However, it will be understood that the invention is equally applicable to a higher order, lower amplitude pendulum damper.

The ends of the tracks 16 are curved sharply upwardly, having a curvature of radius $r^2$, less than $r^1$, as shown in Fig. 2. The normal distance of travel of the rollers on tracks 16 will be less than the rectilinear distance A indicated on Fig. 2, which is determined by the points at which the ends 20 of the races merge with the races 16, i. e., the point of tangency between arcs of radius $r^1$ and $r^2$. The dotted outline 17' of the roller 17 indicates the limit of normal travel, being at one end of the race length A.

Owing to the sharp upward curvature of the end portion 20 of the race, as seen in Fig. 2, which is in a direction substantially radially of crankshaft 10, the roller 17 in moving from position 17' to 17'' likewise moves inwardly until in position 17'' it is moving in the direction of the line TS drawn through the point of tangency between roller 17 in position 17' and arc 20 and parallel to the median line OB. Median line OB is a radius drawn from the center of rotation O through the center of gravity C of the counterweight 18 when the latter is in neutral or equilibrium position, with the rollers 17 at the lowermost or outermost position on the races 16, as indicated in Fig. 1.

The lower surface 21 of the adapter plate 14 is flat and lies normal to the median line OB, or is horizontal. Similarly, the inner surface 22 or floor of the counterweight 18 is flat and also lies normal to the median line OB, or is horizontal, as shown in Fig. 2. Because the counterweight 18 is arranged to always move parallel to itself as a simple pendulum, the surface 22 thereof is likewise always parallel to surface 21 of adapter 14.

The spacing D between surfaces 21 and 22 when the counterweight 18 is in equilibrium position with rollers 17 at the lowermost or outermost positions on races 16, is made such that the surface 21 engages surface 22 flatwise when the rollers 17 lie in the position 17', that is, when the point of tangency T between roller 17 and race end 20 lies on the line TS which extends normal to surfaces 21 and 22. At that instant the counterweight 18 is traveling in a direction parallel to the median line OB, since line TS is parallel thereto.

The operation of the dynamic pendulum damper of this invention will be understood from the foregoing description of the relation between the rollers 17 and the ends 20 of the races 16, whereby any overswing of the counterweight 18 which carries the roller 17 to either end of the arcuate slots 15 to the position 17'' results in inward substantially radial movement of the counterweight 18 and and substantially simultaneous flatwise abutment between floor 22 of the counterweight 18 and the lower surface 21 of the adapter 14. Consequently, owing to the conversion of the direction of movement of the counterweight 18 from tangential during normal swing to radial during overswing, the impact between the counterweight 18 and the adapter 14 becomes an impact in an inward or radial direction, instead of an impact in a tangential direction. In this way, torsional strains on the shaft due to the overswing of the counterweight are avoided during irregular operation of the engine, or during starting before centrifugal force has increased to render the influence of gravity negligible, or during deceleration of the engine. Also, because the movement of the counterweight at or about the moment of impact is moving in a substantially radial direction, its movement is opposed by centrifugal force acting at its center of gravity, and hence the impact is reduced while at the same time being rendered relatively harmless in the manner described. It will be understood that when the races are formed in the counterweight 18 and the rollers are journalled on the crankshaft, as described in said DePew Patent No. 2,272,189, the radial guiding means for the counterweight will be formed on the counterweight instead of on the adapter as shown.

As aforementioned, the harmful impact due to overswing is more pronounced in low order dampers because of the greater amplitude of the pendulum, it nevertheless exists in higher order pendulums, although usually to a lesser degree, and it is therefore to be understood that the invention is applicable to dynamic dampers of all orders. Also, although the invention has been described in connection with one form of dynamic damper, it is equally applicable to other forms, and is further susceptible of changes in form and detail within the scope of the appended claims.

We claim:

1. In a torsional vibration damper for rotary shafts having a counterweight suspended from the shaft for tangential pendulous oscillation, the combination of an abutment on the shaft, an abutment on the counterweight normally spaced from said first abutment and adapted to engage the same during overswing of said counterweight, and guiding means for the counterweight extending substantially parallel to a radius from the center of the shaft through the center of gravity of the counterweight in equilibrium position and effective during such overswing of the counterweight for converting the tangential movement of said counterweight to a substantially radial movement at the time of engagement of said abutments, whereby the impact of said counterweight on the shaft is in a substantially radial direction.

2. In a torsional vibration damper for rotary shafts having a counterweight suspended from the shaft for tangential pendulous oscillation, the combination of an abutment on the shaft extending substantially normal to the radius from the center of the shaft through the center of gravity of the counterweight in equilibrium position, means for guiding said counterweight in a direction substantially parallel to said radius during overswing of said counterweight, and an abutment on the counterweight extending substantially parallel to said first abutment and normally spaced therefrom a distance assuring engagement with said first abutment when said counterweight is guided by said means in a direction substantially parallel to said radius during overswing of said counterweight, whereby the abutment on said counterweight engages the shaft abutment in a direction parallel to said radius during such overswing.

3. In a torsional vibration damper for rotary shafts having a counterweight suspended from the shaft for tangential pendulous oscillation, the combination of a substantially flat abutment on the shaft extending substantially normal to the radius from the center of the shaft through the center of gravity of the counterweight in equilibrium position, means for constraining the counterweight to move inwardly substantially parallel to said radius during overswing thereof, and a substantially flat abutment on the counterweight extending substantially parallel to said first abutment and spaced therefrom a distance equal to the inward movement of the counterweight from equilibrium position to the position of its said parallel inward movement for engaging said first abutment during overswing of the counterweight, whereby the impact of such engagement is in a radial direction.

4. In a torsional vibration damper for rotating shafts having a counterweight element suspended from an element on said shaft for tangential pendulous oscillation, the combination of means on one of said elements for guiding said counterweight in a direction substantially parallel to a radius from the center of the shaft through the center of gravity of the counterweight in equilibrium position during overswing of said counterweight element, whereby the overswing of said counterweight element is opposed by centrifugal force acting radially thereon.

5. In a torsional vibration damper for rotating shafts having a counterweight element, a shaft element, a curved race on one of said elements and a roller on the other element engaging said race for affording tangential pendulous oscillation for said counterweight, the combination of normally spaced abutments on said elements adapted to engage during overswing of said counterweight, and extensions at opposite ends of the race on said one element for guiding said counterweight in a direction substantially parallel to a radius from the center of the shaft through the center of gravity of the counterweight upon engagement of said abutments whereby the impact of said engagement is in a substantially radial direction.

6. In a torsional vibration damper for rotating shafts having a counterweight element, a shaft element, a pair of spaced curved races on one of said elements and a pair of spaced rollers on the other element engaging said races for affording tangential pendulous oscillation for said counterweight, the combination of normally spaced abutments on said elements adapted to engage during overswing of said counterweight, and extensions at opposite ends of the races on said one element for guiding said counterweight in a direction substantially parallel to a radius from the center of the shaft through the center of gravity of the counterweight in equilibrium position upon engagement of said abutments, whereby the impact of said engagement is in a substantially radial direction.

7. In a torsional vibration damper for rotating shafts having a counterweight element, a shaft element, a curved race on one of said elements and a roller on the other element engaging said race for affording tangential pendulous oscillation for said counterweight, the combination of normally spaced parallel flat abutments on said elements adapted to engage during overswing of said counterweight, and extensions at opposite ends of the race on said one element for guiding said counterweight in a direction substantially parallel to a radius from the center of the shaft through the center of gravity of the counterweight in equilibrium position upon engagement of said abutments, whereby the impact of said engagement is in a substantially radial direction.

8. In a torsional vibration damper for rotating shafts having a counterweight provided with spaced rollers engaging spaced curved races on said shaft for affording tangential pendulous oscillation for said counterweight, the combination of a substantially flat abutment on said shaft extending substantially normal to the radius from the center of the shaft through the center of gravity of the counterweight in the equilibrium position, extensions at opposite ends of each race extending substantially parallel to said radius for guiding said rollers correspondingly inwardly toward said shaft during overswing of said counterweight, and a substantially flat abutment on the counterweight extending substantially parallel to said first abutment and spaced therefrom a distance equal to the inward movement of the counterweight from equilibrium position to the position of said inward movement for engaging said first abutment during overswing of the counterweight, whereby the abutment on the counterweight engages the abutment on the shaft in a radial direction during such overswing of the counterweight.

ALFRED T. GREGORY.
FREDERIC E. FULLER.

CERTIFICATE OF CORRECTION.

Patent No. 2,332,072.　　　　　　　　　　　　　　　　　October 19, 1943.

It is hereby certified that error appears in the above numbered patent requiring correction as follows: In the grant, line 1, and in the heading to the printed specification, line 3, for "ALBERT T. GREGORY" read --ALFRED T. GREGORY--; page 2, first column, lines 30 and 53, for "position 17'" read --position 17''--; page 2, first column, line 68, strike out "and" second occurrence; and that the said Letters Patent should be read with this correction therein that the same may conform to the record of the case in the Patent Office.

Signed and sealed this 14th day of December, A. D. 1943.

(Seal)　　　　　　　　　　　　　　　　　　　　Henry Van Arsdale,
　　　　　　　　　　　　　　　　　　　　Acting Commissioner of Patents.